Feb. 10, 1942. G. L. HOLZAPFEL 2,272,341
VAPORIZER AND PRESSURE REGULATOR
Filed Feb. 6, 1940
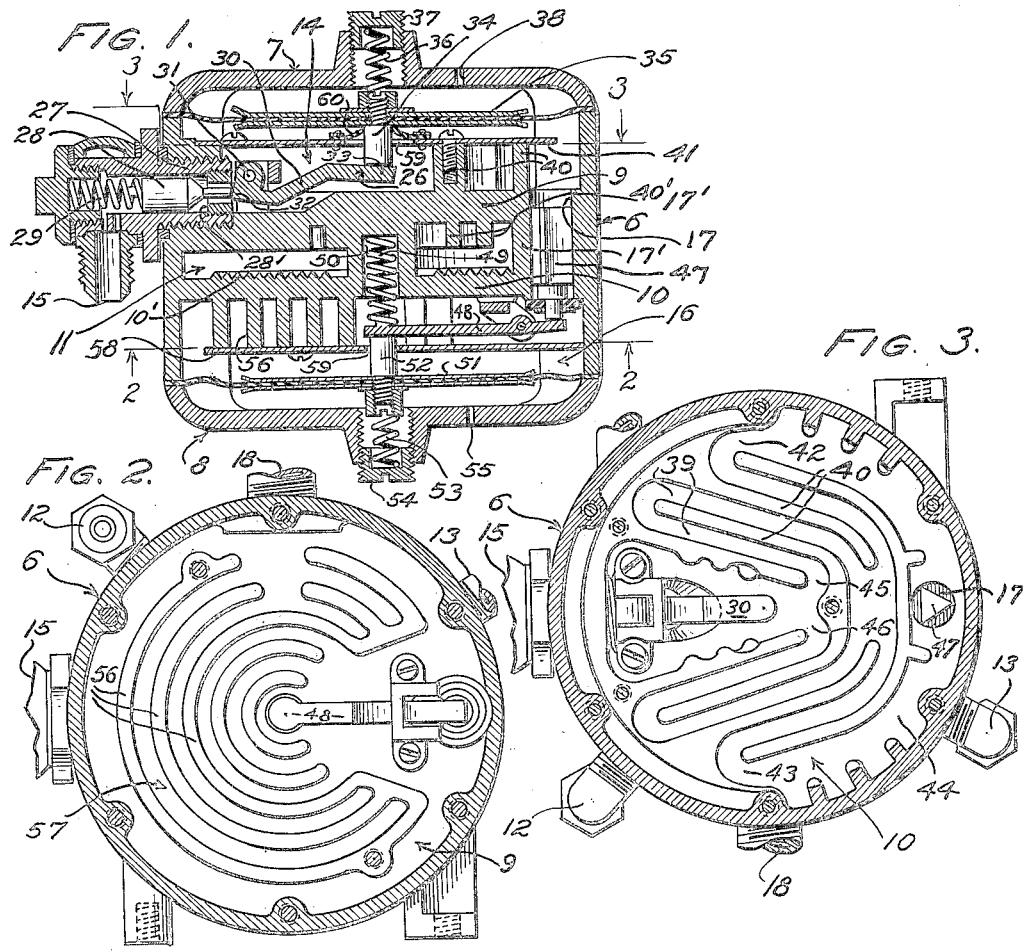
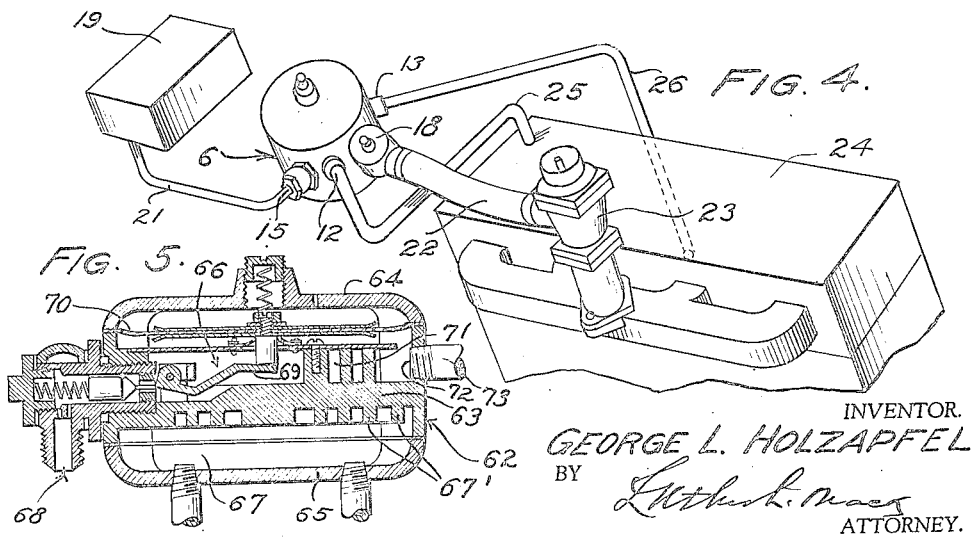
INVENTOR.
GEORGE L. HOLZAPFEL
BY
ATTORNEY.

Patented Feb. 10, 1942

2,272,341

UNITED STATES PATENT OFFICE 2,272,341

VAPORIZER AND PRESSURE REGULATOR

George L. Holzapfel, Los Angeles, Calif.

Application February 6, 1940, Serial No. 317,563

3 Claims. (Cl. 48—106)

My invention relates to and has for its primary purpose the provision of a new and highly efficient combination vaporizer and pressure regulator which is in the form of a compact, comparatively inexpensive and simply constructed unit, especially adapted for vaporizing and regulating the pressure and feeding of highly volatile motor fuel such as butane, whereby such fuel may be correctly carbureted.

Another purpose of my invention is to provide a combined vaporizer and pressure regulator unit of the character described wherein the feed of liquid fuel to the unit is controlled by the pressure regulator means thereof in a reliable and efficient manner.

Another purpose of my invention is to provide a vaporizer and pressure regulator unit such as described which is readily applicable to and suitable for use in connection with different types of internal combustion engines.

A further purpose is to provide a combination vaporizer and pressure regulator such as described wherein the vaporizing means is comparatively simple and inexpensive, yet reliable and thorough in its operation.

Yet another purpose of my invention is to provide a combined vaporizer and pressure regulator such as described, wherein a novel and efficient form of pressure regulator makes possible a controlled feed liquid fuel to the unit and also affords the discharge of vaporized fuel to the mixer or carburetor at substantially atmosphere pressure.

A further purpose is to provide a unit of the character described wherein the vaporizer means is disposed between primary and secondary pressure regulating chambers having means therein for regulating the pressure in two states, with an effective vaporization taking place in each chamber or stage. The first state regulation controls the feed of liquid fuel to the unit and the second state regulation controls the discharge of vaporous fuel from the primary to the secondary chamber and reduces pressure thereof to approximately atmospheric whereby such fuel is prepared for the proper mixing in the carburetor of an internal combustion engine. Instead of the two stage pressure regulation I may use but the primary stage in combination with the vaporizing means and this arrangement affords certain of the hereinbefore noted advantages and makes for a cheaper construction which is well suited to preparing butane or similar fuel for correct carburetion for certain types of engines.

I have shown in the accompanying drawing a preferred form of vaporizer and pressure regulator embodying my invention, subject however, to modification, within the scope of the appended claims, without departing from the spirit of my invention.

Referring to the drawing:

Fig. 1 is a vertical sectional view of a combined vaporizer and pressure regulator embodying my invention.

Fig. 2 is a sectional view taken on the line 2—2 of Fig. 1.

Fig. 3 is a sectional view taken on the line 3—3 of Fig. 1.

Fig. 4 is a schematic perspective view of the vaporizer and pressure regulator as when installed for operation with an internal combustion engine.

Fig. 5 is a vertical sectional view of a modified form of my invention.

One embodiment of my combined vaporizer and pressure regulator comprises a hollow cylindrical body portion 6, a top closure 7, a bottom closure 8 and horizontally disposed partitions or walls 9 and 10 formed integrally with the body portion. These partitions define between them a heating chamber 11 having an intake 12 for a heating fluid and a fluid outlet 13 whereby hot water, steam or the like may be circulated through said chamber.

Between the partition 9 and the top closure 7 is a primary vaporizing and pressure regulating chamber 14 having a valved liquid fuel intake 15. A secondary vaporizing and pressure regulating chamber 16 is defined between the partition 10 and bottom closure 8 and is communicated with the primary chamber through a valved passage 17 extending through the partitions and a web portion 17' between the latter. This secondary chamber has an outlet 18 through which vaporized fuel is discharged.

As shown in Fig. 4, a typical installation of a vaporizer and regulator embodying my invention includes a source of supply 19 of fuel such as liquid butane, a feed line 21 leading therefrom to the intake 15, a vaporized fuel line 22 leading from the outlet 18 to a mixer or carburetor 23 of the internal combustion engine 24 and hot water lines 25 and 26 leading from the engine to the heating chamber 11. Fuel entering the vaporizer and pressure regulator unit is vaporized and the vaporized fuel at substantially atmospheric pressure passes from the unit through the fuel line 22 to the carburetor 23 whereby the proper mixture may be effected preparatory to feeding the fuel mixture to the engine.

As here provided, the valved intake 15 is controlled by pressure regulating means 26 in the primary chamber and includes a tubular fitting 27 extending into said chamber and slidably housing a valve 28 which is adapted to engage an annular seat 28' at the inner end of the fitting to shut off the feed to the primary chamber. A spring 29 tends to seat this valve but the valve is normally held open by the pressure regulating means. The pressure regulating means 26 includes a lever 30 pivoted as at 31 in the primary chamber so that one end 32 will contact the valve and the other end 33 may be engaged by a pin 34 carried by a diaphragm 35 lying between the upper end of the body portion and upper closure 7 and secured to said closure so as to be removable therewith. A spring 36 is disposed between a tension adjusting plug 37 in the cover 7 and the diaphragm and is stronger than the spring 29 so that the pin 34 is forced inwardly against the lever 30 whereby the end 32 of the latter will normally engage and unseat the intake valve as shown in Fig. 1. The space between the diaphragm and cover is open to the atmosphere through the opening 38 in the cover.

Liquid fuel entering the primary chamber through the valved intake 15 will enter one or more tortuous passages 39 formed between spaced ribs or fins 40 that are integral with the partition 9. The upper portions of the passages 39 are closed by a cover plate 41 whereby to form a labyrinth in which the fuel courses back and forth between the fins so as to be thoroughly vaporized before discharging from the labyrinth outlets 42 and 43 into an arcuate space 44 with which the passage 17 is communicated. As here shown the labyrinth also has two intakes 45 and 46. As the fuel becomes vaporized the pressure thereof in the primary chamber increases and lifts the diaphragm 35, thereby releasing the pressure of the spring 36 and allowing the spring 29 to close the intake valve whereby to shut off the feed of liquid fuel to said chamber.

A valve 47 in the passage 17 is normally closed by means of a lever 48 pivotally mounted in the secondary chamber, and a spring 49 seated in a socket 50 in the partition 10. This spring bears upon one end of the lever so that the other end of the lever will be raised and held and valve closed as shown in Fig. 1, it being noted that the spring 49 is of sufficient strength to maintain the valve 47 closed against the pressure in the primary chamber.

A pressure regulating means in the secondary chamber also controls the valve 47 and comprises a diaphragm 51 arranged correspondingly to the one in the primary chamber and provided with a pin 52 which is normally urged against the lever 48 by means of a spring 53 corresponding in function and arrangement to spring 36. A tension adjusting means 54 is provided for the spring 53. The bottom closure is provided with an opening 55 to permit the application of atmospheric pressure to one side of the diaphragm 51.

In the secondary chamber is a series of ribs or vanes 56 which are formed on the partition 10 and form a tortuous passage or labyrinth 57, there being a cover plate 58 for confining the vaporous fuel to said labyrinth whereby to more effectively vaporize the fuel. In this connection it is noted that the pin 52 is movable in an opening 59 in the cover 58 and that the other diaphragm pin 34 is slidable in a similar opening 59 in the diaphragm 35. One or both of these pins may be provided with a small annular diaphragm 60 for providing a leak proof seal around the pin, said diaphragm being fixed to the pin and cover plate at its peripheries.

Inasmuch as the vaporous fuel outlet 18 is connected with the suction feed line 22 leading to the carburetor, the pressure in said line and the secondary chamber will drop below atmospheric when the engine is started and the diaphragm 51 is therefore moved inwardly due to the fact that the force exerted by the spring 53 and diaphragm 51 through the pin 52 on the lever 48 plus the primary chamber pressure on the valve 47, is normally but slightly less than the force of the spring 49. Thus it is seen that upon creating a sub-atmospheric pressure in the secondary chamber, the atmospheric pressure against the diaphragm aided by the spring 53 causes the diaphragm to move inward and the pin 52 to push against the lever 48 to allow the valve 47 to open. The above atmospheric vapor in the primary chamber now flows through the passage 17 into the secondary chamber where further vaporization may take place in the labyrinth, before the fuel discharges through the outlet 18. As the vaporized fuel discharges from the primary chamber the pressure therein drops and allows the diaphragm 35 to move inwardly whereby the pin 34 will rock the lever 30 so that the intake valve will be again opened and allow additional liquid fuel to enter the primary chamber. As the primary chamber pressure is relieved from the valve 47 and its associated lever when such valve is opened, it is seen that the spring 49 due to its comparatively greater tension will rock such lever whereby to again close the valve 47. In other words when the pressure in the secondary chamber reaches atmospheric the diaphragm 51 will be extended outwardly and the spring 49 will operate to close the valve 47 as aforesaid.

As shown in Fig. 5 a modified form of apparatus embodying my invention includes all of the parts and arrangements of the apparatus shown in Figs. 1 to 4 inclusive, except the secondary chamber pressure regulating means therein. In this form a cylindrical portion 62 has a partition 63 defining between end closures 64 and 65 a vaporizing chamber 66 and a heater chamber 67. The vaporizing chamber has a valved liquid fuel intake means 68 identical with the intake means in the first described form. This means includes a valve operating lever 69 and diaphragm 70. A labyrinth 71 identical with those in the first described form as to instruction and mode of operation is provided in the chamber 66. An outlet 72 to which a pipe 73 is connected, is provided in the body 62 in the chamber 66 whereby vaporized fuel will discharge from said chamber. Hot water or other heating fluid is passed through intake and outlet ports 72 and 75 whereby to heat the body and labyrinth and vaporize the liquid fuel as it courses through the labyrinth. This form is suitable for use in connection with certain types of engines.

It should be noted that the partition 9 which forms the upper wall of the heating chamber 11 is provided with depending heat transfer fins 49'. Similar fins 67' are provided in the modified form of the invention shown in Fig. 5. In the preferred form, however, the lower wall 10 of the chamber 11 may be formed with similar ribs or fins 10'.

It will now be seen that I have provided a combined vaporizer and pressure regulator which will be more compact and efficient, by reason of the construction and arrangement of the parts and elements as hereinbefore described and shown in the accompanying drawing.

It should be noted that the spring 49 holds valve 47 on its seat with greater force than is necessary to prevent egress of gas from the primary into the secondary chamber. In order to get the equivalent of atmospheris pressure in the lower chamber, I therefore use the spring 53 which is adjustable and works in the opposite direction to the spring 49. In this way the pressure of the valve 47 upon its seat can be adjusted to a nicety. Furthermore should pressure in the lower pressure chamber rise, the valve 47 can not be forced upon its seat with greater force than is exerted by the spring 49. A still further advantage is that the diaphragm 51 can be cemented to the end member 8 and the whole assembly may be easily removed without interfering with the spring 49 and its associated mechanism. The upper chamber is provided with similar arrangements for the same purposes.

I claim:

1. A vaporizer and pressure regulator comprising a hollow body, a heating chamber in said hollow body, the walls of said heating chamber and said hollow body defining a primary chamber on one side of said heating chamber, and a secondary chamber on the other side of said heating chamber, an inlet to said primary chamber, an outlet from said primary chamber, a passage between said primary and secondary chambers, a pressure responsive means positioned in said primary chamber, a valve in said inlet, an operating connection between said pressure responsive means and said valve whereby said valve is opened and closed to maintain a controlled pressure in said primary chamber, a valve in said passage between the primary and the secondary chamber, a pressure responsive means in said secondary chamber, an operating connection between said valve in said last mentioned passage and said pressure responsive means whereby said valve is opened and closed to maintain a controlled pressure in said secondary chamber, a heating fluid inlet to said heating chamber and a heating fluid outlet from said heating chamber.

2. A vaporizer and pressure regulator comprising a hollow body, a heating chamber in said hollow body, the walls of said heating chamber and said hollow body defining a primary chamber on one side of said heating chamber, and a secondary chamber on the other side of said heating chamber, an inlet to said primary chamber, an outlet from said primary chamber, a passage between said primary and second chambers, a pressure responsive means in communication with said primary chamber, a valve in said inlet, an operating connection between said pressure responsive means and said valve whereby said valve is opened and closed to maintain a controlled pressure in said primary chamber, a valve in said passage between the primary and the secondary chamber, a pressure responsive means in communication with said secondary chamber, an operating connection between said valve in said last mentioned passage and said pressure responsive means whereby said valve is opened and closed to maintain a controlled pressure in said secondary chamber, a heating fluid inlet to said heating chamber and a heating fluid outlet from said heating chamber.

3. A vaporizer and pressure regulator comprising a hollow body, a plurality of partitions in said hollow body, said partitions forming walls of the heating chamber, heating fluid inlet to and heating fluid outlet from the heating chamber, one of said partitions and the walls of said hollow body defining a primary chamber, an inlet to said primary chamber, fins on said last named partition extending into said primary chamber, a cover plate on said fins forming with said fins a restricted passage, said restricted passage communicating with the inlet to said primary chamber, said cover plate and the walls of said hollow body defining a diaphragm chamber separated from but communicating with said restricted passage, a pressure responsive diaphragm in said diaphragm chamber responsive to pressures in said restricted passage, a valve in said inlet to said primary chamber, operating connection between said diaphragm pressure responsive means and said valve whereby said valve is opened and closed to maintain a controlled pressure in said primary chamber, an outlet from said restricted passage and said primary chamber, another of said partitions and the walls of said hollow body defining a secondary chamber, fins on said last named partition, said fins extending into said secondary chamber, a second cover plate on said last named fins forming with said fins a second restricted passage, a communicating passage connecting said last named outlet from the primary chamber with said last named restricted passage, a valve in said last named passage, the walls of said hollow body and said last named cover plate forming a second diaphragm chamber in said secondary chamber, a communication between said diaphragm chamber and said last named restricted passage, diaphragm pressure responsive means in said diaphragm chamber, said pressure responsive means being responsive to pressures in said second named restricted passage, operating connections between said last named pressure responsive means and said last named valve whereby said valve is opened and closed to maintain a controlled pressure on said last named restricted passage, an outlet from said restricted passage and said secondary chamber.

GEORGE L. HOLZAPFEL.